April 3, 1962

L. D. SOLLENBERGER 3,027,866

INDICATING MECHANISM

Filed April 13, 1959

Inventor:-
Lester D. Sollenberger,
By Hofgren, Brady, Wegner,
Allen & Stellman Atty's.

April 3, 1962 L. D. SOLLENBERGER 3,027,866
INDICATING MECHANISM
Filed April 13, 1959 4 Sheets-Sheet 2

Inventor:-
Lester D. Sollenberger.
By Hofgren, Brady, Wegner,
Allen & Stellman Attys.

April 3, 1962 L. D. SOLLENBERGER 3,027,866
INDICATING MECHANISM
Filed April 13, 1959 4 Sheets-Sheet 3

Inventor:-
Lester D. Sollenberger,
By Hofgren, Brady, Wegner,
Allen & Stellman Attys.

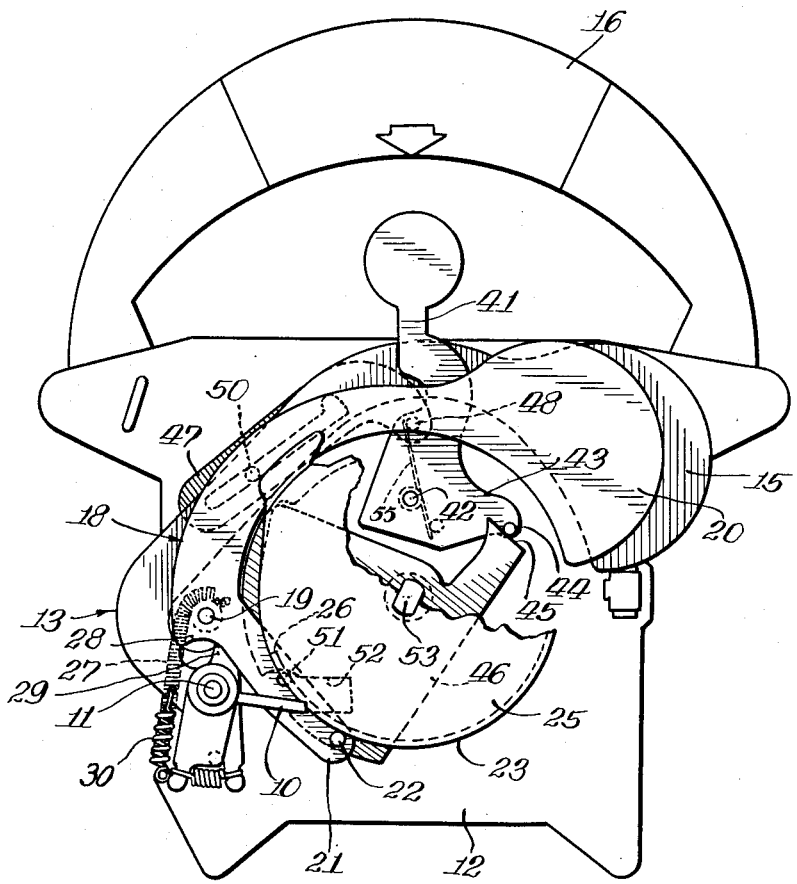

United States Patent Office 3,027,866
Patented Apr. 3, 1962

3,027,866
INDICATING MECHANISM
Lester D. Sollenberger, Chicago, Ill., assignor to Nautec Corporation, a corporation of New York
Filed Apr. 13, 1959, Ser. No. 805,835
5 Claims. (Cl. 116—114)

This invention relates to a parking meter and more particularly to indicating and timing mechanisms for parking meters.

It is the general object of the present invention to produce a new and improved parking meter of the character described.

It is a more particular object of the invention to produce a parking meter having new and improved timing and indicating mechanisms.

A further object of the invention is to produce a parking meter designed to prevent the use by a parking motorist of time purchased by a preceding motorist who has just vacated the parking area.

In the usual parking meter, there is provided an indicator of some sort to indicate the amount of parking time purchased, which indicator is customarily driven across the face of a calibrated dial by a clockwork mechanism so that a simple inspection reveals the amount of time remaining on the meter. It has been the understandable custom of the motoring public to take advantage of any unexpired purchased time remaining on a parking meter in purchasing time for his own use. Thus, if a motorist estimates that 45 minutes will suffice for his business at a particular spot and 15 or 20 minutes remain on the meter governing the area where he is parking, such motorist will purchase only an additional 30 minutes of parking time rather than the full 45 minutes for his proposed stay. Clearly, the municipality suffers a loss of revenue from actions such as the foregoing and it has been the desire for some time to produce a meter which would prevent a subsequent motorist from so taking advantage of any unused time purchased by the preceding occupant of the parking area.

According to the present invention, there is produced a parking meter which will prevent a subsequent motorist from using time purchased by another. The particular meter chosen as an exemplary embodiment of the invention being so constructed and arranged as to have but two basic positions, one indicating a violation and the other a non-violation. Thus, in lieu of an indicating pointer and calibrated dial the meter is provided with a simple indicator indicating a non-violation, i.e., legal parking. A motorist pulling into a parking area governed by a parking meter displaying a non-violation signal cannot ascertain by reference to the signal or dial the amount of time remaining on the meter. Not knowing whether there are 20 minutes or 2 minutes left on the meter, the motorist will be expected to purchase, by the insertion of the proper coins in the meter, the total amount of time during which he expects to occupy the parking space and thus the municipality is not deprived of the revenue which it feels it is entitled to receive.

Accordingly, it is a further and more specific object of the invention to produce a parking meter which, rather than indicating unexpired time remaining on the meter, merely indicates a violation or non-violation of the parking time limit.

Other and further objects and advantages of the present invention will be readily apparent from the following description and drawings, in which:

FIG. 4 is a front elevation thereof, with the meter in still another, legal or "unexpired time," position.

Figure 1:
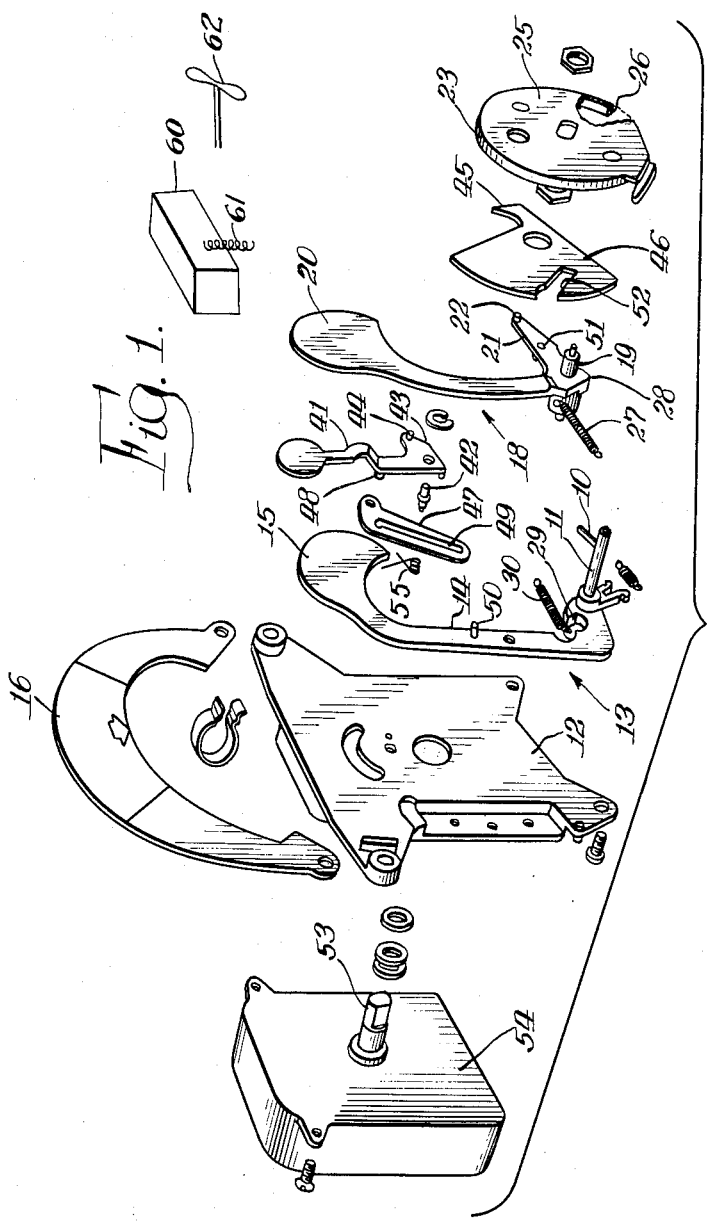
FIG. 1 is an exploded perspective view showing the various parts of the timing and indicating apparatus embodying the invention.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

It will be clear to those skilled in the art that the features of the present invention can be combined with the meter mechanisms in many different model parking meters. For the purpose of exemplary illustration of the invention, the parts are constructed and arranged in a fashion to be applicable to the type of parking meter shown in the Sollenberger Patent No. 2,603,288, reference to which may be had for various details of the entire parking meter. For the purposes of the present disclosure it may be assumed that the parking meter is provided with a stand mounting a housing in which the mechanism of the meter is encased. Suitable coin slots are provided for the reception of coins and the coins may be moved by a manual handle while in a coin carrier, all as generally described in the aforementioned Sollenberger patent. Herein the coin carrier 60 in its "at rest" position is urged against a pin 10 (FIG. 1) by means of a spring 61, thereby to rotate the shaft 11 in a clockwise direction (as seen in FIG. 1). Herein, the coin carrier is shown diagrammatically, for details of the structure thereof reference may be had to said Sollenberger patent. The shaft 11 is rotatably carried in frame plate 12 of the parking meter mechanism. Rigidly joined to the shaft 11 is a trouble flag designated 13, normally colored red, with the flag having an elongate vertical arm portion 14 and a tab portion 15 at its upper extremity. As will be more fully understood when the discussion has progressed further, the trouble flag 13 does not appear in the space below the arcuate plate 16 except when the coin carrier 60 is at a position other than its normal rest position. Thus, as in the corresponding structure of said Sollenberger patent, when the coin carrier 60 is moved out of its rest position by operation of the handle 62 by the motorist, the trouble flag is moved into view.

A second flag 18 is secured to a short shaft 19 pivoted in suitable bearings in frame plates including the frame plate 12. The flag 18 is the "expired time" flag and is also provided with a flat tab-like upper extremity 20 at the end of an elongated shank portion. The shank portions of flags 13 and 18 are so proportioned that when both flags are in their retracted position as shown in FIG. 4, their tab portions are substantially in registration. Extending inwardly from the shaft 19 at substantially right angles to the lower end of the shank portion of flag 18 is an arm 21 which carries at its extremity a small pin 22 which functions as a cam follower in cooperation with cam surface 23 on a control wheel 25. The control wheel 25 is turned by a winding wheel (not shown herein, for an illustration thereof see said Sollenberger patent) of the meter mechanism to turn therewith. The cam surface 23 comprises a narrow flange extending around most of the circumference of the control wheel 25 but having at least one gap 26 therein. The relative positions of the wheel 25 and the flag 18 are such that the follower 22 will ride on the cam surface 23 when the flag 18 is retracted, and as the control wheel 25 rotates, the gap 26 will be brought to the position of the cam follower 22, permitting the flag 18 to rotate on its pivot (unless otherwise prevented) and rise to the position shown in FIG. 2, from which it is visible externally of the meter. Coil spring 27 is connected to the flag 18 and to a frame member of the meter to urge the flag upwardly toward its externally visible position.

Immediately below the shaft 19 the flag 18 is provided with a surface 28 contoured to mate with a second surface 29 formed on the flag 13 immediately adjacent the shaft 11. In assembled position, flags 13 and 18 interrelate surfaces 28 and 29 so as to prevent the expired time flag 18 from being raised to visible position at the same time as trouble flag 13. That is, when trouble flag 13 is raised, surface 29 contacts the surface 28 and forces the flag 18 to rotate on its shaft to its retracted position. Trouble flag 13 is urged toward its raised or visible position by a coil spring 30 which is considerably stronger than the coil spring 27 so as to be able to overcome the same but weaker, of course, than the spring or other means which urge the coin carrier 60 against the lever pin 10 when the carrier 60 is in its "at rest" position.

Figure 3:
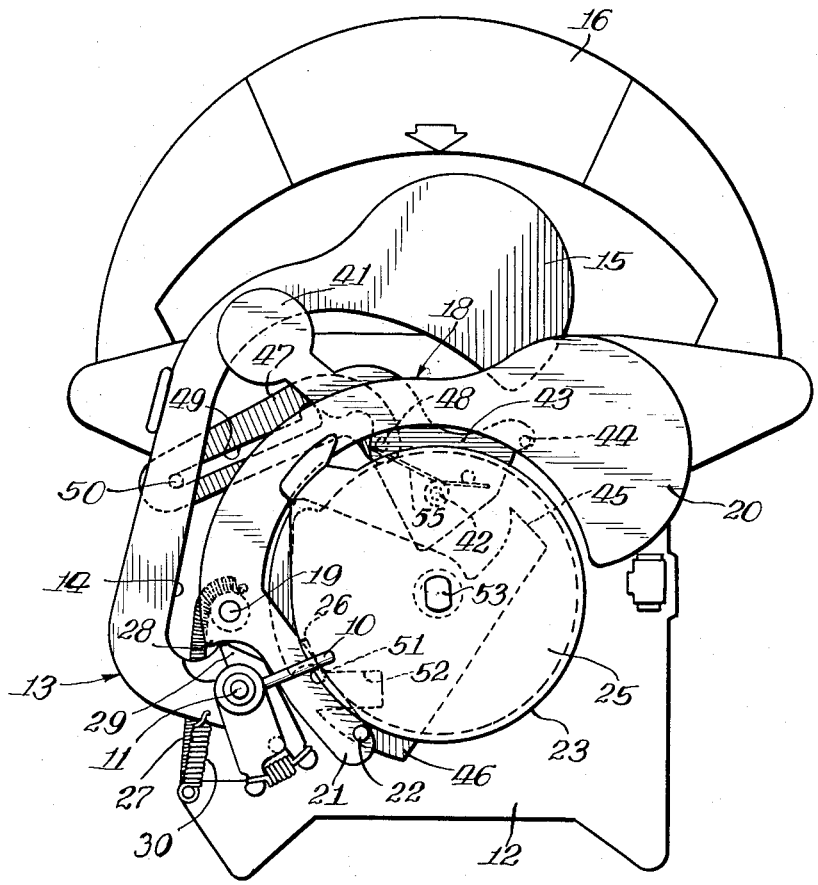
FIG. 3 is a front elevation thereof, with the meter in another, "violation," position.

An indicator 41 is pivoted at its lower end on a pin 42 mounted in the frame member 12 with the indicator being provided with an arm 43 extending outwardly beyond the pivot point of the indicator and carrying at its outer end a pin 44 designed to operate as a cam follower. The follower 44 is adapted to contact the cam surface 45 formed on a cam wheel 46 mounted in the frame plates. A slotted link 47 is pivoted at one end to the pivot pin 48 secured to the indicator 41 with the link having a slot 49 engaging a pin 50 secured to the vertical portion 14 of the flag 13. The lengths of the link 47 and slot 49 are so proportioned that whenever flag 13 is raised to its visible position as shown in FIG. 3, the indicator is pulled to the extreme left-hand side of the meter as shown in FIG. 3 and thus to its out of view position.

A pin 51 is secured to the arm 21 of flag 18 and engaged by the sides of a slot 52 in the cam wheel 46.

Figure 2:
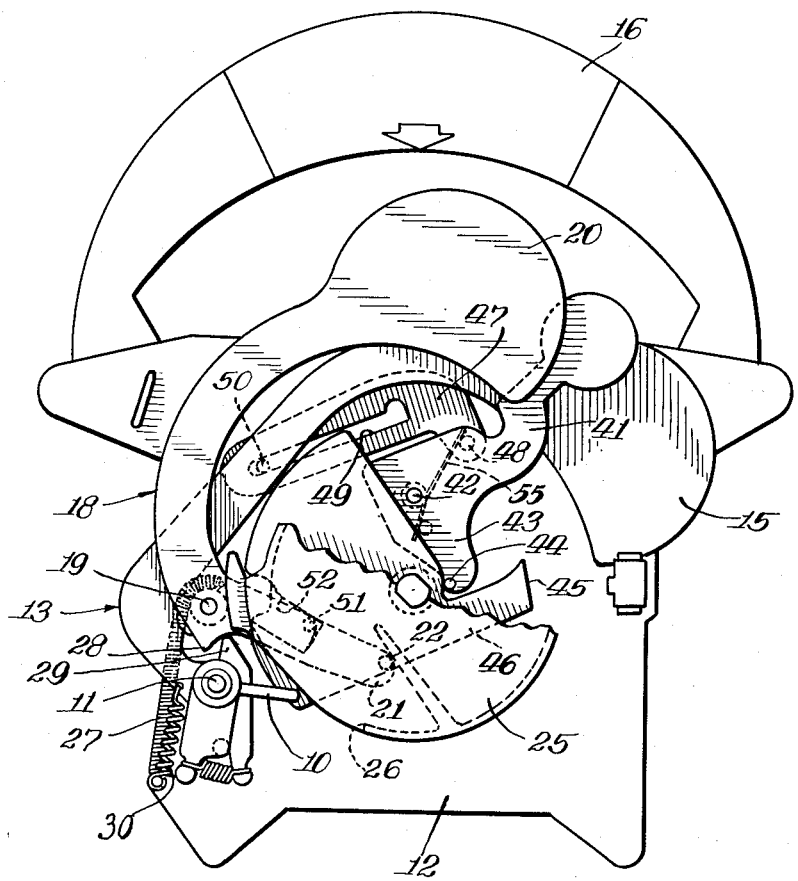
FIG. 2 is a front elevation partly broken away, of the parking meter, with the meter in the "time expired" position.

In describing the operation of the timing and indicating mechanism of the present invention, let it be assumed that the purchased parking time has expired whereupon the parts will be shown as indicated in FIG. 2 wherein the flag 18 displays its tab portion 20 for view. The coin carrier will have pivoted the lever pin 10 to the position indicated thereby depressing the tab portion 15 of the flag 13. Insertion of a coin into the coin carrier 60 and rotation of the handle 62 serves to move the coin carrier off of the lever pin 10, thus permitting the parts to move to the position shown in FIG. 3 wherein the spring 30 will have raised the tab portion 15 of the flag 13 into view. At the same time, the pin 50 will have traveled to the extremity of the slot 49 to pull the indicator 41 to the left or nonoperative position shown. The flag 18 has been moved to the position illustrated depressing the tab portion 20 by the action of the spring 30 overcoming the spring 27 and, simultaneously with the raising of the flag 13, the pin 51 is moved downwardly to the position shown in FIG. 2 and by its engagement with the side of the slot 52 in the cam wheel 46 permits the cam wheel to rotate by its own weight to the position shown shown in FIG. 2, thereby positioning the cam surface 45 in position to engage the pin 44 on the indicator arm 43.

Release of the handle 62 and return of the coin carrier 60 to its rest position moves the parts to the position shown in FIG. 4 wherein engagement of the pin 44 with the cam surface 45 holds the indicator 41 in the exposed position while, similarly, engagement of the pin 22 with the cam surface 23 holds the flag tab portion 20 in depressed position. Contact of the coin carrier 60 with the lever pin 10 holds the flag 13 and hence the tab portion 15 in similarly depressed position.

The control wheel 25 is connected to a shaft 53 rotated through a conventional slip clutch (not shown) by a conventional clockwork, or timing, mechanism 54 and through the medium thereof the control wheel 23 is rotated to bring the gap 26 to the location of the pin 22. When this occurs, two things happen. First, the flag 18 is permitted to pivot on its shaft 19 under the urging of the spring 27 to raise the flag 18 to the exposed position illustrated in FIG. 2. Simultaneously, the pin 51 carried by the arm 21 secured to the flag 18 serves through its engagement with the sides of the slot 52 to rotate the cam wheel 46, thereby moving the cam surface 45 out of engagement with the pin 44. When this occurs, the torsion spring 55, secured at one end to the frame plate 12 and contacting the indicator 41 at the other end, serves to move the indicator 41 to the position shown in FIG. 2.

Inasmuch as during the period when the time on the meter is unexpired only the indicator 41 is visible, it obviously cannot be ascertained merely by inspection how much time remains on the meter and, consequently, the motorist will be compelled to purchase whatever time he actually needs.

I claim:

1. Indicating mechanism for a coin-operated parking meter comprising a frame, a timing mechanism in the frame, a cam driven by the timing mechanism, a violation flag pivotally mounted in the frame and movable between a first, out-of-view position to a second, visible position, a cam follower on said flag engaging said cam, said cam having a first portion contacting the follower to maintain the flag in the second position, and a second portion permitting movement of the flag to the first position, an indicator movably mounted in the frame, means urging the indicator to a first, out-of-view position, movable stop means for holding the indicator in a single second, visible position, and means interconnecting the violation flag and said stop means and operable to move said stop means out of indicator holding position to permit the indicator to move to said first position when the cam follower on the flag reaches said cam second portion.

2. Indicating mechanism for a coin-operated parking meter or the like comprising a frame, a timing mechanism in the frame, a violation flag pivoted in the frame for movement from a first, out-of-view position to a second, visible position, means biasing the flag toward said second position, an indicator pivoted in the frame for movement from a first, out-of-view position to a single second, visible position, means operable to hold said indicator in said second position only when said flag is in said first position, and means operated by said timing device to hold said flag in said first position for a predetermined period and then to release said flag for movement to said second position upon the expiration of said period.

3. Indicating mechanism for a coin-operated parking meter or the like comprising a timing mechanism and indicator, means for rendering said indicator visible or invisible exteriorly of the meter, means operable upon insertion of a coin to render said indicator visible and to initiate operation of the timing mechanism through a predetermined time cycle, means operable to maintain said indicator fixed in a single visible position during said time cycle, and means for rendering the indicator invisible upon expiration of said cycle.

4. Indicating mechanism for a coin-operated parking meter or the like comprising a timing mechanism, an indicator movable from a first, out-of-view position to a single second, visible position, means operable upon insertion of a coin to move the indicator to the second position and to initiate operation of the timing mechanism through a predetermined time cycle, means operable to maintain the indicator in said second position during said time cycle, and means for moving the indicator from said second position to said first position upon expiration of said cycle.

5. Indicating mechanism for a coin-operated parking meter or the like comprising a timing mechanism, an indicator movable from a first, out-of-view position to a second, visible position, a violation flag movable from a first, out-of-view position to a single second-visible position, means operable upon insertion of a coin to move the flag to the first position and to move the indicator to the second position and to initiate operation of the timing mechanism through a predetermined time cycle, means operable to maintain the indicator in said second position during said time cycle, and means for moving the indicator from asid second position to said first position and for moving the flag to said second position upon expiration of said cycle.

References Cited in the file of this patent
UNITED STATES PATENTS
2,603,288   Sollenberger _____ July 15, 1952